G. H. WHITE.
FRICTION DRIVE FOR MILK TANKS.
APPLICATION FILED SEPT. 9, 1921.

1,421,641.

Patented July 4, 1922.

Inventor
George Hall White.

By [signature]
his Attorney

UNITED STATES PATENT OFFICE.

GEORGE HALL WHITE, OF WASHINGTON, DISTRICT OF COLUMBIA, ASSIGNOR TO GEORGE P. SACKS, OF BRADLEY HILLS, MARYLAND.

FRICTION DRIVE FOR MILK TANKS.

1,421,641.   Specification of Letters Patent.   Patented July 4, 1922.

Application filed September, 9 1921. Serial No. 499,502.

*To all whom it may concern:*

Be it known that I, GEORGE HALL WHITE, a citizen of the United States, residing at Washington, District of Columbia, have invented certain new and useful Improvements in Friction Drives for Milk Tanks, of which the following is a specification.

This invention relates to a friction drive designed particularly for agitating tanks, wherein material is treated for various purposes, for example, in connection with dairy products and the like.

In tanks of this character, it has heretofore been proposed to mount the agitator proper upon a shaft which extends through the wall of a tank and is connected to a controllable driving mechanism, in order that varying speeds of operation of the agitator may be secured. The agitator has a self-grinding bearing in the tank, in order to avoid the use of packing, and while a friction drive has been found desirable in this type of apparatus, it has proven objectionable in that the very pressure required to secure the friction drive has proven a disadvantage in connection with the self-grinding bearing of the agitator.

It is the object of the present invention to provide a friction drive which while directly connected to the shaft of the agitator is without endwise influence on said shaft, whereby the self-grinding bearing of the agitator is maintained in the most effective condition for a proper non-leaking packless connection. The improved friction drive involves opposing friction discs, one of which has a sliding but non-rotative connection with the agitator shaft, and the other of which is wholly free of connection with the shaft, there being provided means whereby independent though balanced pressure may be applied to these friction discs, in order to secure the necessary frictional cooperation with the driving element without undesirable endwise influence upon the agitator shaft. Furthermore, there is provided in connection with the friction drive and as a part thereof, an independent auxiliary element serving to accurately balance any tendency of the driving element to disturb the normal parallel relation of the friction discs, this auxiliary element also acting in itself as a friction element in the driving connection.

Figure 1:
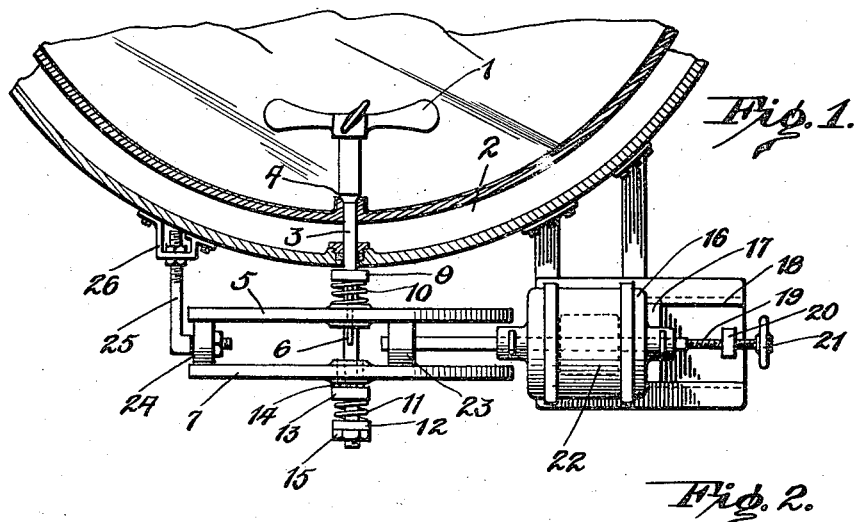
Fig. 1 is a sectional view illustrating the friction drive of this invention.
Figure 2:
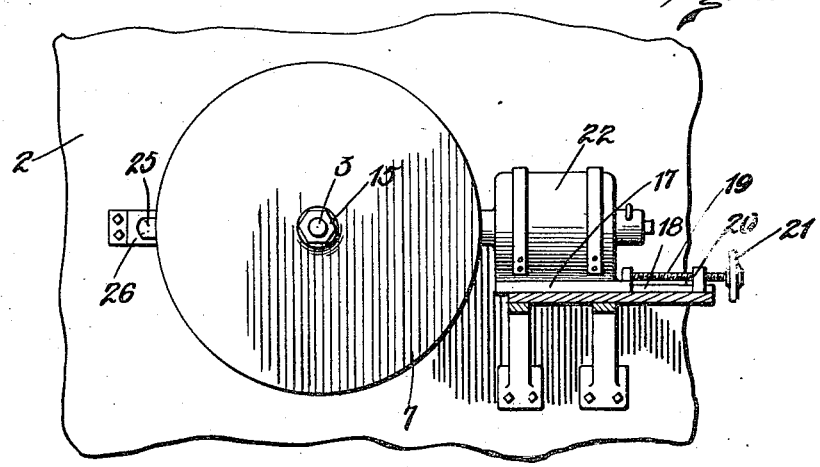
Fig. 2 is a bottom plan of the same.
Figure 3:
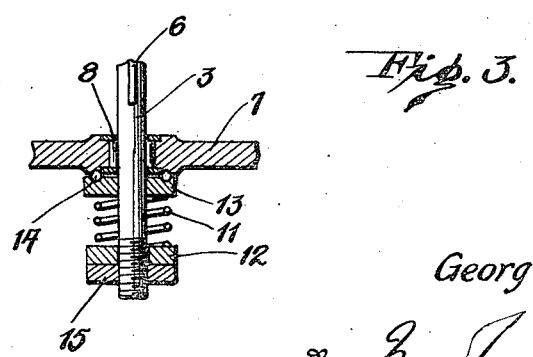
Fig. 3 is a section of the mounting of the idler disc.

The improved friction drive is designed to operate an agitator 1 arranged within the tank 2, the shaft 3 of the agitator passing through the wall of the tank and having a self-grinding bearing therein at 4.

Keyed for longitudinal movement on the shaft 3 beyond the tank is a friction disc 5, hereinafter termed the driven disc, the key 6 between said disc and shaft permitting independent axial movement of the disc without disturbing its driving connection with the shaft. An exactly similar disc 7 is mounted upon a roller bearing 8 carried by the shaft, this disc 7 being therefore wholly free of any connection with the shaft 3.

An adjusting collar 9 is threaded or otherwise mounted for adjustment on and longitudinally of the shaft 3, and interposed between this collar and the hub enlargement of the driven disc 5 is a coil spring 10. A similar spring 11 is interposed between an adjusting collar 12 adjustably cooperating with the shaft 3 and a thrust collar 13 having a bearing 14 interposed between it and the hub enlargement of the disc 7. A lock nut 15 secures the collar 12 in adjusted position.

The power element is here shown as a motor 16 supported upon a base 17 slidably mounted upon a bed 18. An adjusting member 19 cooperates with the base and is threaded through a block 20 rising from the bed, the adjusting member being provided with an operating wheel or handle 21. Thus, the base to which the motor is secured and therefore the motor, may be adjusted longitudinally of the bed to the extent desired. The armature shaft 22 of the motor extends between the discs 5 and 7 and is provided with a driving friction wheel 23 adapted to cooperate with the surfaces of the respective discs, as shown. Obviously, by adjusting the motor through the member 19, the driving member 23 may cooperate with the discs at different radial distances from the center, and thus control the speed of the driven disc 5 at will.

Diametrically opposing the driving member 23, there is arranged between the discs 5 and 7 an auxiliary friction element 24 supported upon a shaft 25 preferably mounted for adjustment in a bracket 26 secured to an appropriate part of the tank 2. The auxiliary member 24 is of exactly similar diameter to that of the driving member 23, and hence tends to avoid possible non-parallel position of the discs 5 and 7 incident to the driving action of the friction element 23.

It will be apparent from the above description that any desired tension to the limit of the springs 10 and 11 may be obtained by use of the adjusting collars 9 and 12, and hence the desired frictional cooperation with the driving element 23 may be obtained absolutely free of a corresponding endwise pressure upon the shaft 3. Obviously, the friction cooperation of the driving member 23 and the driven disc 5 and idle disc 7 will be due entirely to the pressure of the springs 10 and 11, and if these springs are in opposition with respect to any endwise pressure upon the shaft 3, it is apparent that this shaft pressure, is completely avoided. Hence the self-grinding bearing 4 of the agitator shaft is maintained under all operating conditions in absolutely normal condition, the frictional drive being without any effect whatever thereon.

The auxiliary member 24 in addition to acting to maintain the discs in exact parallelism for the proper cooperation of the driving element 23, will necessarily assist in transferring the driving action as movement communicated to the idle disc will be communicated to the driven disc 5 through this auxiliary member 24 as will be apparent.

Claims:

1. A friction drive having a shaft, opposing friction discs mounted thereon, a driving element cooperating with said discs, and means to adjust the pressure of said discs independently with respect to the element without inducing a corresponding endwise pressure of the shaft.

2. The combination with an agitator shaft of a material treating tank, of opposing friction discs mounted thereon, a friction driving element operating between said discs, and means to adjust the pressure of said discs independently with respect to said element, said means acting in opposition with respect to the shaft to thereby avoid corresponding end thrust of the shaft.

3. The combination with an operating shaft of a driven disc keyed thereon for movement longitudinally of the shaft, an idler disc mounted for free movement on the shaft, a driving element interposed between the shafts, a spring for forcing the driven disc towards the driving element, a spring for forcing the idler disc towards the element, and means for independently adjusting the tension of said springs.

4. The combination with an operating shaft of a driven disc keyed thereon for movement longitudinally of the shaft, an idler disc mounted for free movement on the shaft, a driving element interposed between the shafts, a spring for forcing the driven disc towards the driving element, a spring for forcing the idler disc towards the element, means for independently adjusting the tension of said springs, and means for adjusting the driving element radially of the discs.

5. The combination with an operating shaft of a driven disc keyed thereon for movement longitudinally of the shaft, an idler disc mounted for free movement on the shaft, a driving element interposed between the shafts, a spring for forcing the driven disc towards the driving element, a spring for forcing the idler disc towards the element, means for independently adjusting the tension of said springs, and an auxiliary friction element arranged between said discs in diametric opposition to the driving element.

In testimony whereof I affix my signature.

GEORGE HALL WHITE.